United States Patent [19]

Stretch

[11] Patent Number: 5,078,648

[45] Date of Patent: * Jan. 7, 1992

[54] DRIVELINE ISOLATOR WITH HYDRAULIC DAMPER AND SPIRAL SPRINGS

[75] Inventor: Dale A. Stretch, Novi, Mich.

[73] Assignee: Eaton Corporation, Cleveland, Ohio

[ * ] Notice: The portion of the term of this patent subsequent to Jan. 7, 2009 has been disclaimed.

[21] Appl. No.: 503,011

[22] Filed: Apr. 2, 1990

[51] Int. Cl.$^5$ .............................. F16D 3/12; F16D 3/80
[52] U.S. Cl. ................................. 464/27; 192/3.29; 192/106.1; 464/58
[58] Field of Search ................ 464/24, 25, 27, 57–60, 464/98; 192/106.1, 3.29

[56] References Cited

U.S. PATENT DOCUMENTS

| | | | |
|---|---|---|---|
| 1,127,154 | 2/1915 | Andersen et al. | 464/58 X |
| 1,630,737 | 7/1924 | Flanders | 464/24 |
| 1,978,922 | 11/1931 | Wemp | 464/97 |
| 3,653,228 | 4/1972 | Tiberio . | |
| 4,148,200 | 4/1979 | Schallhorn et al. . | |
| 4,181,208 | 1/1980 | Davis | 464/58 X |
| 4,398,436 | 4/1980 | Fisher | 74/688 |
| 4,576,259 | 3/1986 | Bopp | 192/106.1 X |
| 4,690,256 | 9/1987 | Bopp et al. | 192/21 |
| 4,781,653 | 12/1985 | Nakamura et al. | 464/58 |
| 4,782,936 | 11/1988 | Bopp | 192/106.2 |
| 4,838,107 | 11/1987 | Herrmann | 74/411 |
| 4,944,374 | 7/1990 | Casse et al. | 192/106.1 X |

FOREIGN PATENT DOCUMENTS

| | | | |
|---|---|---|---|
| 1953196 | 4/1970 | Fed. Rep. of Germany | 464/58 |
| 2099091 | 5/1982 | United Kingdom . | |

Primary Examiner—Daniel P. Stodola
Assistant Examiner—William G. Battista, Jr.
Attorney, Agent, or Firm—P. S. Rulon

[57] ABSTRACT

Torsion damping isolator assemblies (19 or 100 or 200) are disposed for damping torsionals in a vehicle driveline. The assemblies include spiral springs (62 or 202,204) and a vane damper assembly (22 or 206) disposed in parallel and immersed in automatic transmission fluid of a torque converter housing (24). The damper assemblies include first and second relatively rotatable housing members (66,68 or 208,210). The housing first members are connected to radially inner ends of the springs, and the second members are connected to radially outer ends of the springs. The housing members define chambers which vary inversely in volume in response to flexing of the spring assemblies by driveline torsionals. The chambers communicate with the fluid in the torque converter housing via restricted passages (86,88 or 220f,220g). As the chambers vary in volume, energy from the torsionals is converted to fluid pressure in the chambers decreasing in volume. Assemblies (19 and 100) include lugs (77a) drivingly connecting the second member (68) to the torque housing. The lugs define valving members (77c,77d) which close or partially close the passages associated with the chamber decreasing in volume. Assembly (200) includes improved mounting (228,230) of the spring outer ends (202a,204a) and improved mounting (238) of the spring inner ends (202b,204b). Damper assembly (206) includes independent pistons (220) circumferentially held in position by drive lugs (226) which also function as valving members in a manner analogous to lugs (77a).

22 Claims, 7 Drawing Sheets

DRIVELINE ISOLATOR WITH HYDRAULIC DAMPER AND SPIRAL SPRINGS

CROSS REFERENCE

This application is related to U.S. application Ser. No. 07/370,320, filed on June 22, 1989 and U.S. application Ser. No. 503,010, filed Apr. 2, 1990, and both assigned to the assignee of this application.

BACKGROUND OF THE INVENTION

This invention relates to driveline torsion isolator mechanisms operable over the entire operational range of a driveline. More specifically, the invention relates to such mechanisms for vehicle drivelines.

It is well-known that the speed of an Otto or Diesel cycle engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement or other factors, torque pulses ring through the driveline and also derogate ride quality, such pulses are herein also referred to as torsionals.

Since the inception of the automobile, many torsion damping devices or schemes have been proposed and used to isolate and dampen driveline torsionals. For example, master clutches, used in combination with mechanical transmissions, have long employed springs and secondary mechanical friction devices to respectively isolate and dampen torsionals. Typically, torsionals are isolated or absorbed by a plurality of circumferentially spaced, coil springs disposed in parallel with each other between the master clutch primary friction input and splined output. Damping is provided by secondary mechanical friction surfaces disposed in parallel with the springs and biased together with a predetermined force. Damping occurs when the amplitude of the torsionals exceeds the breakaway or slip torque of the secondary friction surfaces. With this arrangement, portions of the torsionals less than the slip torque of the secondary friction surfaces are transmitted directly through the clutch without flexing or isolation by the springs, i.e., the arrangement provides neither torsion isolation nor damping. If the slip torque of the secondary friction surfaces is reduced by design or wear of the secondary surfaces, damping is reduced. Further, any portions of the torsionals greater than the spring energy absorption or storage capacity are also transmitted directly through the clutch. If the spring rate is increased to prevent spring collapse, the springs transmit lesser amplitude torsionals directly through with little or no effective isolation or absorption of the torsionals.

To increase the operational spring range and storage capacity of a torsion damping assembly, Wemp in U.S. Pat. No. 1,978,922, proposed using a low spring rate torsion sleeve capable of flexing substantially more than the coil springs used with master clutches. This arrangement, like the master clutch arrangement, also employs secondary mechanical friction surfaces disposed in parallel and biased together with a predetermined force to provide damping. Hence, the Wemp arrangement also fails to provide isolation and damping of torsionals below the slip or breakaway torque of the secondary friction surfaces. The Wemp arrangement is also underdamped if the slip or breakaway torque of the secondary friction surfaces is reduced.

It is know to dampen driveline torsionals with a vane damper as may be seen by reference to U.S. Pat. No. 4,690,256 to Bopp et al and incorporated herein by reference. In U.S. Pat. No. 4,690,256 three is disclosed a torsion damping isolator assembly immersed in the oil of a torque converter housing. The assembly includes resilient means for transmitting driveline torque between input and output drives, and an expandable chamber mechanism connected in parallel with the resilient means. The resilient means are of the long travel type allowing about fifty rotational degrees of travel between the input and output drives. The mechanism, which is also of the long travel type, includes first and second relatively movable members connected to opposite ends of the resilient means and defining at least two chambers which vary inversely in volume in response to flexing of the resilient means and which are in communication with the torque converter oil via restricted passages. The restricted passages provide inflow or charging of the volumes with torque converter oil to prevent cavitation and control damping by restricting the rate of outflow of oil from the volumes.

The long travel resilient and expandable chamber mechanism of U.S. Pat. No. 4,690,256 has proven to be an excellent torsion damping assembly. However, problems have arisen with respect to life of the long travel resilient means, with respect to control of oil flow to and from the volumes of the expandable chamber mechanism for respectively preventing cavitation of the expanding volumes and for ensuring sufficient oil pressure building up in the contracting volumes, and with respect to manufacture of the mechanism at a low cost with necessary accuracy.

SUMMARY OF THE INVENTION

An object of the present invention is to provide a torsion damping assembly which is effective to isolate and dampen driveline torsionals over substantially the entire operational range of the driveline and which employs fluid pressure to dampen the driveline torsionals.

Another object of the present invention is to provide such an assembly immersed in automatic transmission fluid in a torque converter housing of an automatic transmission and employing the automatic transmission fluid to damp the driveline torsionals.

According to a feature of the invention, a torsion isolator assembly includes resilient means and a damping mechanism connected in parallel between first and second drives with the drives being adapted to be serially connected in a driveline. The resilient means are at least two nested spiral wound springs having radially outer and inner ends drivingly connected by spring attachment means between the drives. The spring transmits driveline torque between the drives and are operative to flex and thereby attenuate driveline torsionals. The damping mechanism includes first and second assemblies respectively adapted for driving connection with the first and second drives. The assemblies are mounted for relative to-and-fro rotation about a common axis in response to relative to-and-fro rotation of the drives effected by flexing of the springs. The relative rotation of the assemblies damps flexing of the springs.

The improvement characterized by:

the spring attachment means for the spring outer ends including means for preventing pivotal movement of the spring outer ends when the springs are contracting radially inward; and the spring attachment means for the spring inner ends including means for allowing unrestricted pivotal movement of the spring inner ends when the springs are expanding radially outward.

According to a feature of the present invention, a torsion damping assembly is adapted to be disposed in a driveline torque converter housing filled with uncompressible fluid, immersed in the fluid, and drivingly connected between rotatably mounted input and output drives. The assembly includes long travel spiral wound spring for transmitting driveline torque between the drives and a rotary vane damper mechanism. The invention is characterized by spring attachments for pivotally attaching radially inner ends of the springs to reduce the stress at the inner ends during torque reversals.

BRIEF DESCRIPTION OF THE DRAWINGS

The torsion damping assembly of the present invention is shown in the accompanying drawings in which:

FIGS. 8-11 illustrate another modified embodiment of the torsion damping assembly according to the invention of this application.

DETAILED DESCRIPTION OF THE DRAWINGS

Figure 1:
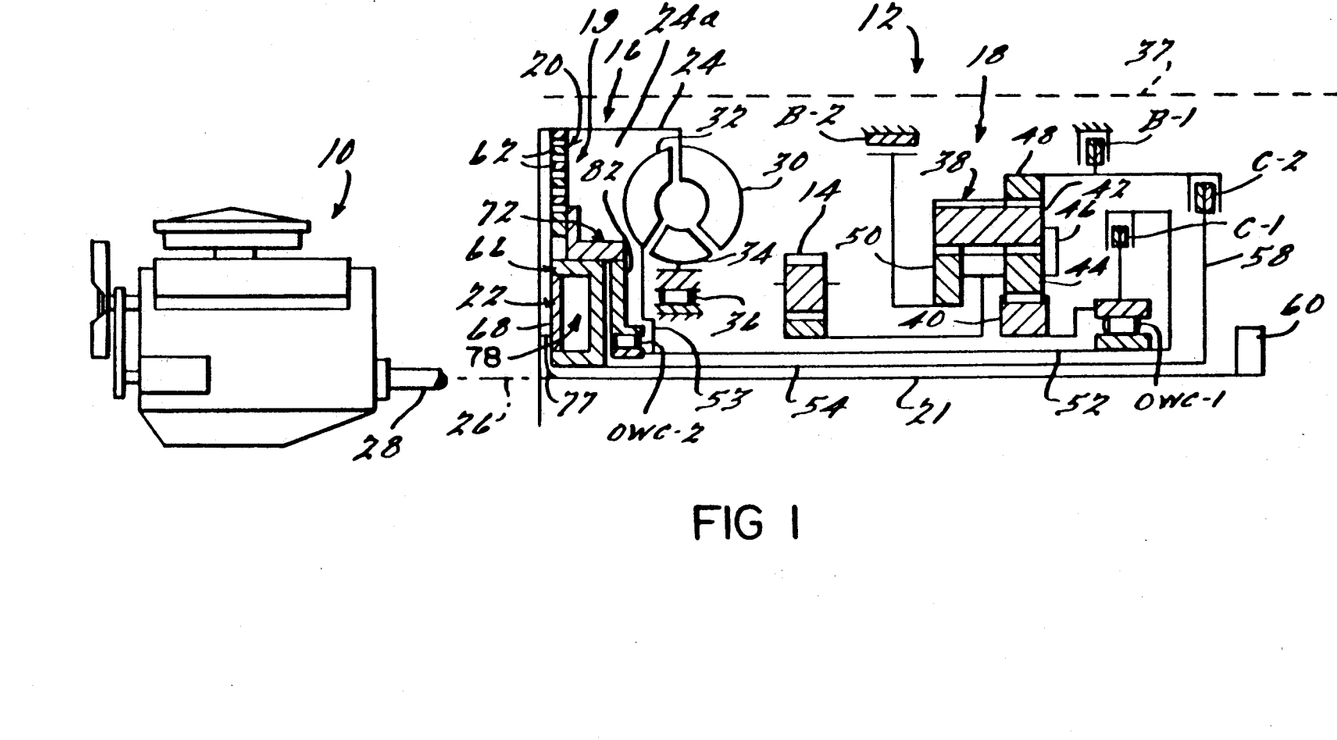
FIG. 1 is a schematic view of a portion of a motor vehicle driveline including the torsion damping assembly of the present invention.

The motor vehicle driveline, seen schematically in FIG. 1, includes an internal combustion engine 10 and an automatic transmission 12 having an output drive or gear 14 for driving a load such as unshown rear and/or front wheels of a vehicle.

The transmission 12 comprises a hydrokinetic fluid coupling or torque converter assembly 16, a ratio section 18, and a torsion damping isolator assembly 19 including a spring assembly 20 and a vane damper assembly 22. Components 16-22 are substantially symmetrical about a rotational axis defined by a shaft 21 of the transmission and are shown only above the axis for simplicity and brevity.

Torque converter assembly 16 is disposed within a torque converter housing 24 rotationally driven by an input drive 26 connected directly to a crankshaft 28 of the engine in any of several well-known manners. Converter assembly 16 may be of any well-known type and includes an impeller 30 driven by housing 24, a turbine 32 driven hydrokinetically by the impeller, and a stator 34 connectable by a one-way roller clutch 36 to a ground such as a non-rotatable portion of the transmission housing represented by phantom lines 37. Torque converter housing 24 is filled with an incompressible fluid or transmission oil which is commonly referred to as automatic transmission fluid (ATF), which lubricates the ratio section 18, and which is often pressurized in the torque converter housing 24.

Transmission 12 is a modified form of the generally known class of split input torque transmissions disclosed in U.S. Pat. No. 4,398,436 and published British Patent Application No. 2,099,091A, both of which are incorporated herein by reference. Ratio section 18 comprises a planetary gear set 38 controlled by friction clutches C-1 and C-2, one-way clutch OWC-1, and brakes B-1 and B-2 to provide a reverse and three forward speed ratio modes of operation. Planetary gear set 38 includes a first sun gear 40, first and second sets of planetary gears 42,44 supported by a common planet carrier 46, a ring gear 48, and a second sun gear 50. Sun gear 40 is connectable to a first quill or torque converter driven shaft 52 via clutch C-1 or clutch OWC-1. Shaft 52 is in turn connected to turbine 32 via a radially extending member 53. The first and second sets of planetary gears are respectively in constant mesh with each other, with sun gears 40 and 50, and with ring gear 48. Planetary carrier 46 is in constant or direct driving relation with output gear 14. Ring gear 48 is connectable to ground via brake B-1 or to a second quill shaft 54 via clutch C-2. Shaft 54 is connected at its left end to the vane damper 22 and at its right end to clutch C-2 via a radially extending flange or spider 58. Sun gear 50 is in constant mesh with planetary gears 42 and is connected to ground via brake B-2. Ratio section 18 further includes an oil pump 60 driven by shaft 21 for pressurizing the ATF.

Figure 2:
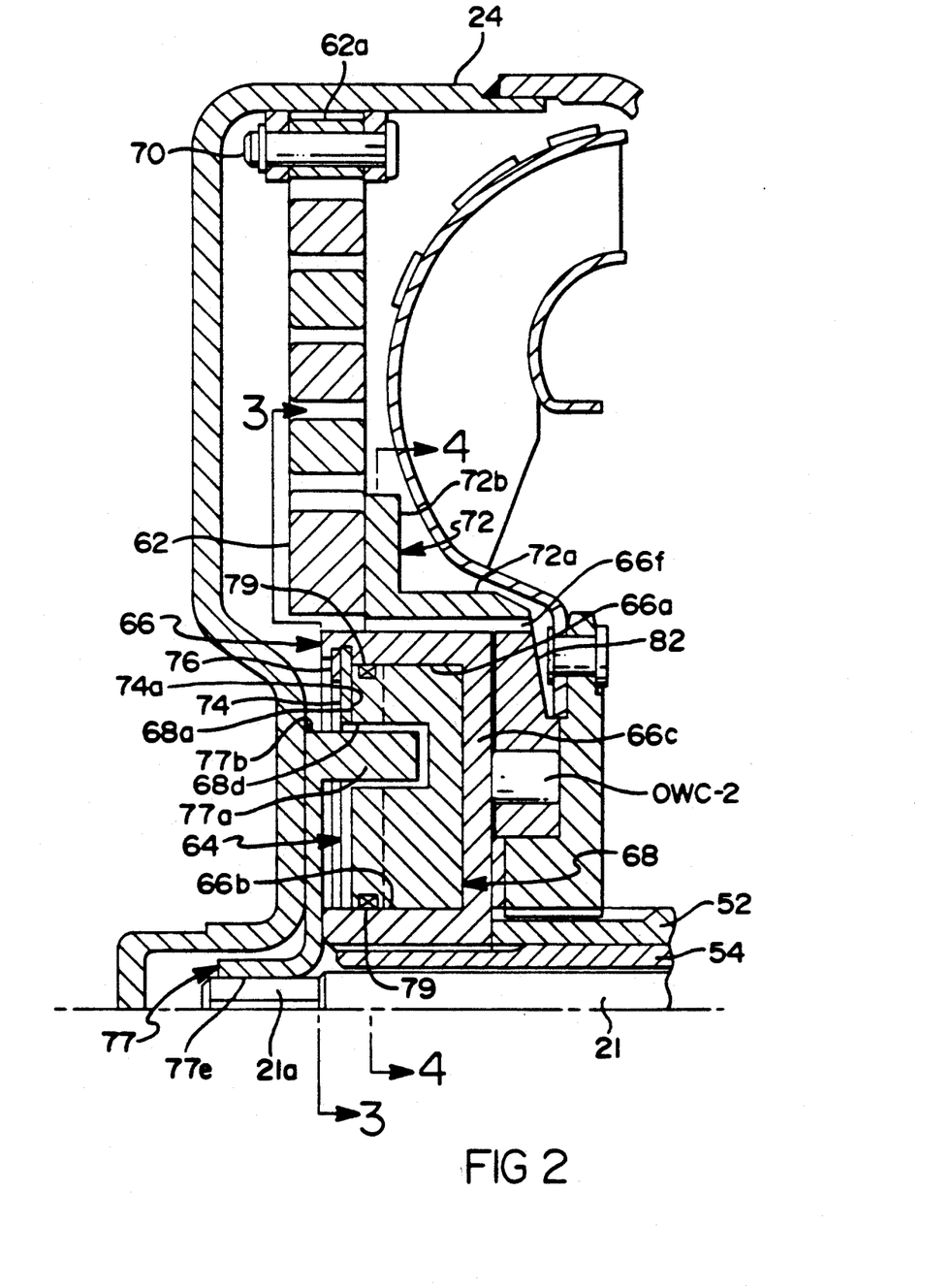
FIG. 2 is a partial, detailed, sectional view of the transmission of FIG. 1 with the torsion damping assembly also shown in detail.
Figure 3:
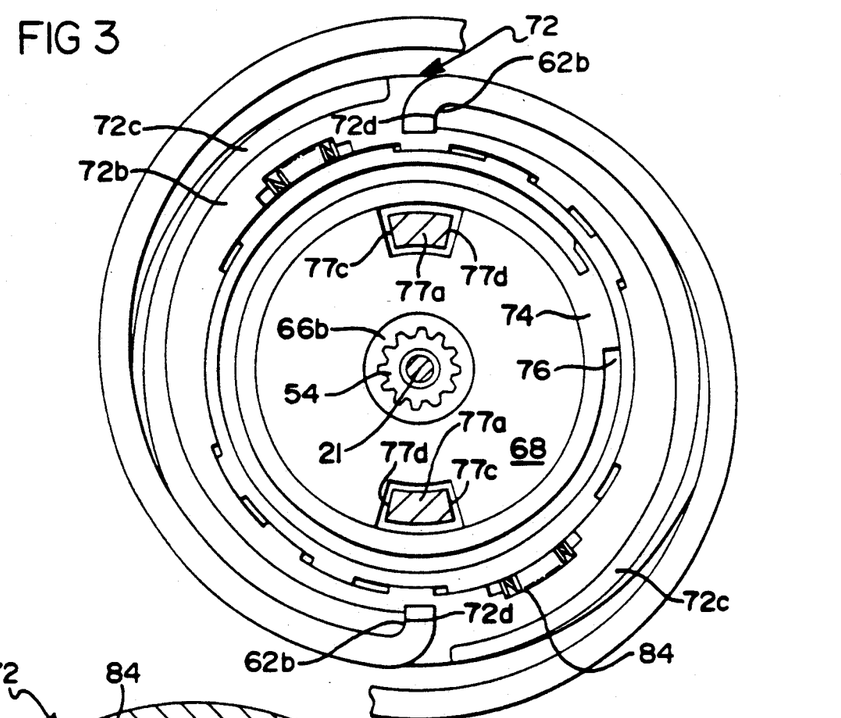
FIG. 3 is a partial, elevational view of the torsion damping assembly in relief and looking along line 3—3 of FIG. 2.
Figure 4:
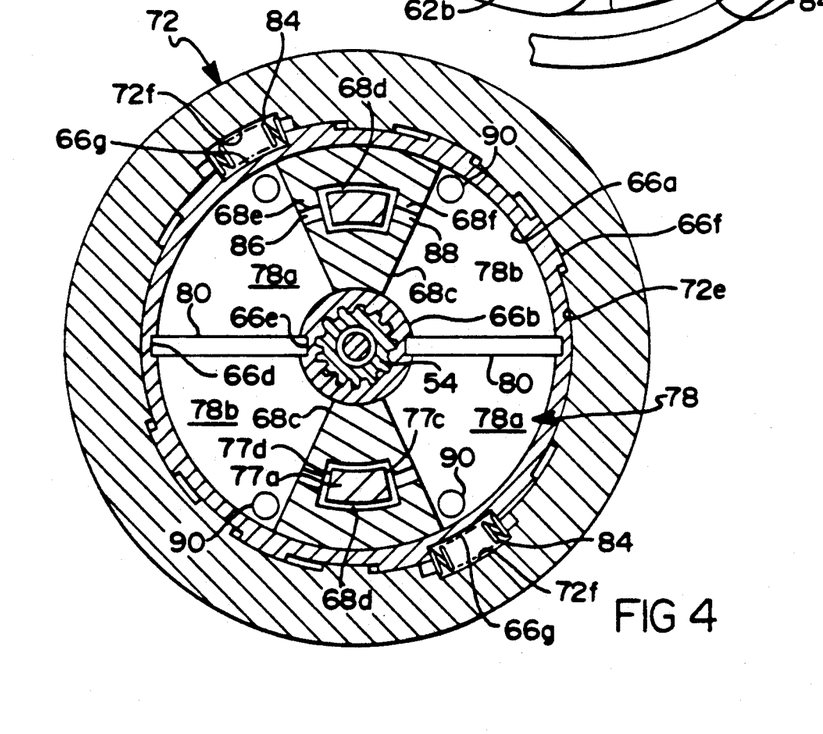
FIG. 4 is a partial, sectional view of a vane damper in the torsion damping assembly looking along line 4—4 of FIG. 2.

Looking now at the schematic representation of the torsion damping assembly 19 in FIG. 1 and in the more detailed illustration in FIGS. 2-4, assembly 19 is disposed within an annular compartment 24a defined by torque converter housing 24. Assembly 19 is immersed within the pressurized oil in compartment 24a. Spring assembly 20 includes two interdigitated or nested, flat, spiral wound torsion springs 62 flexible over a range of about fifty rotational degrees. Other types of springs may be used. However, such springs are preferably of the long travel type. Vane damper assembly 22 includes an annular housing assembly 64 having first and second relatively rotatable housing members 66,68.

Springs 62 are pivotally fixed at their radially outer ends 62a to torque converter housing 24 by pins 70 disposed 180 degrees apart; only one end 62a and one pin 70 are shown in the drawings. Radially inner ends 62b of springs 62 are drivingly connected or hooked to an annular bracket 72. Alternatively, spring end 62a may be connected as disclosed in U.S. Pat. No. 4,782,936 which is incorporated herein by reference. Bracket 72 includes a cylindrical or axially extending leg 72a, a radially extending leg 72b, and a pair of scroll-like flanges 72c extending axially from leg 72b. The scroll-like flanges are visible only in FIG. 3. Ends 62b of spring 62 hook over ends 72d of flanges 72c to effect the driving connection therebetween. Flanges 72c also radially support springs 62.

Member 66 includes axially extending cylindrical wall portions 66a,66b and a radially extending annular wall portion 66c. Member 68 includes a radially extending annular wall disposed within the cylindrical walls 66a,66b and retained therein by an annular thrust member 74 and a snap ring 76. The interface 68a,74a of housing member 68 and thrust member 74 may be a bearing-like surface to minimize friction. However, the interface, preferably, frictionally interacts to provide a secondary torsion damping which increases in magnitude with increasing driveline torsionals, as explained in further detail herein after. Member 68 is drivingly connected to torque converter housing 24, in a manner explained further herein after, via a pair of lugs 77a extending axially from a bracket 77 welded at 77b to housing 24. Bracket 77 also includes a hexagonal opening 77e at its center which receives a hexagonal end 21a of pump shaft 21. Members 66,68 define an annular compartment 78 containing oil from or of the type in torque converter compartment 24a. Compartment 78 is preferably sealed by seals 79 retained in grooves in member 68. As may be seen in FIG. 4, damper compartment 78 is divided into pairs of variable volume chambers 78a,78b by pairs of partitions or vanes 80,68c which respectively extend radially across the compartment. Vanes 80 are fixed to member 66 via axially extending grooves 66d,66e in the cylindrically inner and outer surfaces of cylinder walls 66a,66b. Vanes 68c are integrally formed with member 68 and extend axially therefrom into compartment 78. Adjacent relatively movable surfaces of the housing members and vanes are in sliding sealing relation to minimize and control fluid flow between the variable volume chambers. Housing member 66 is connected directly to external splines on quill shaft 54 via mating internal splines on cylindrical wall 66b. Housing member 66 and bracket 72 are drivingly interconnected for limited relative rotation via external splines 66f on cylindrical wall 66 and internal splines 72e on cylindrical leg 72a of the bracket. Bracket 72 is also connected to the outer race of a one-way clutch OWC-2 by a radially extending portion 82 of the race. The inner race of OWC-2 is fixed to turbine 32 and quill shaft 52. Splines 66f,72e are circumferentially biased apart by a pair of helical compression springs 84 disposed in pairs of recesses 66g,72f respectively defined by member 66 and bracket 72.

Figures 5, 6:
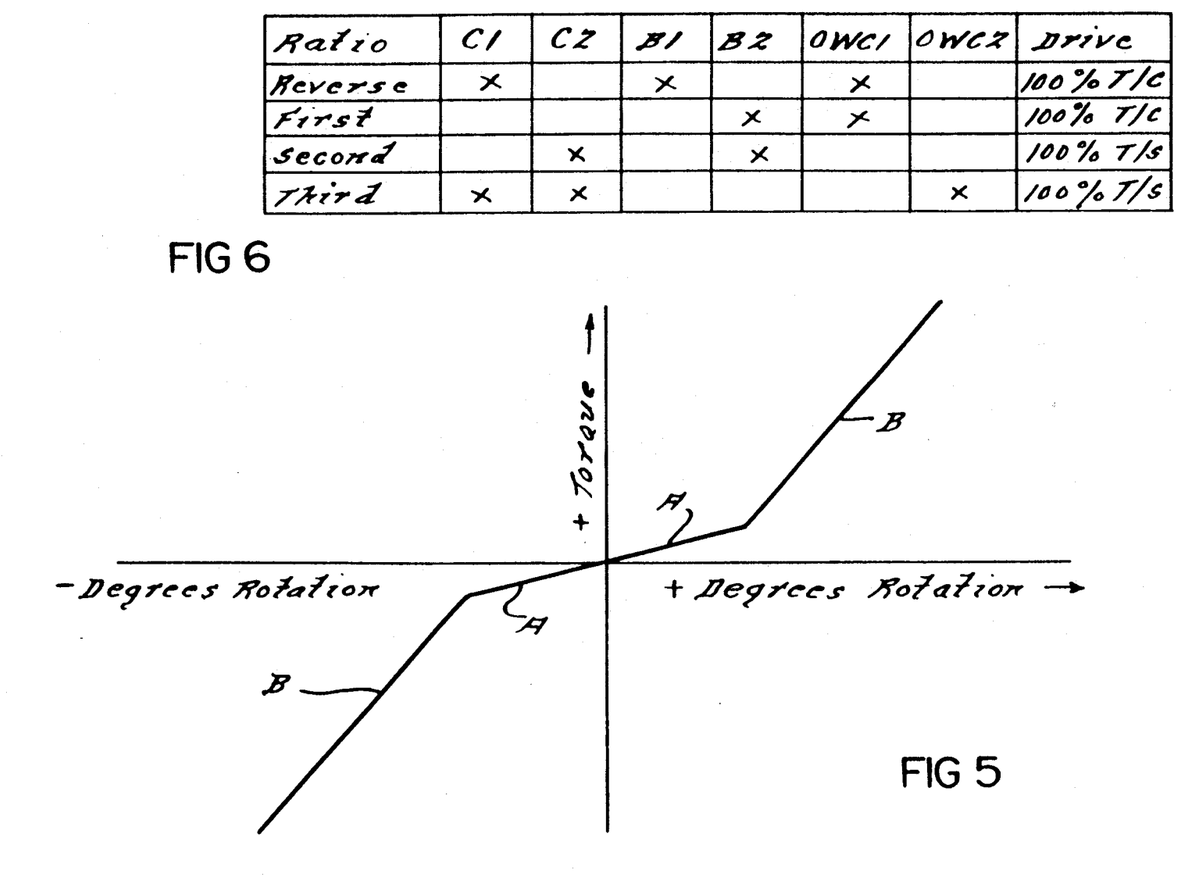
FIG. 5 is a graph schematically illustrating the spring rate characteristics of the torsion damping assembly in FIGS. 1-4.
FIG. 6 is a chart showing clutch and brake engagement for shifting the transmission of FIG. 1.

Springs 62 and 84 provide torsion damping assembly 19 with two spring rates as schematically illustrated in FIG. 5. Springs 84 provide a relatively low spring rate represented by low slope curve A when the driveline torque is below a predetermined amount and a substantially greater spring rate represented by higher slope curves B when the driveline torque is above the predetermined amount.

Member 68 includes a pair of outwardly opening, arcuate recesses 68d formed in vanes 68c and having ends defined by surfaces of radially extending wall portions 68e,68f. Restricted passages or orifices 86,88 in wall portions 68e,68f respectively communicate variable volume chambers 78a,78b with the pressurized oil in torque converter compartment 24a via recesses 68d. Lugs 77a of bracket 77 extend into recesses 68d for drivingly connecting member 68 to torque converter housing 24. The lugs each include oppositely facing, radially extending surfaces or valving members 77c,77d circumferentially spaced a predetermined number or rotational degrees from the mutually facing surfaces of wall portion 68e,68f and aligned with the associated restricted passages.

The valving members 77c,77d move into positions for closing or partially closing the passages associated with the variable volume chambers which, at any given time, are decreasing in volume, and which move away from the passages associated with the chambers increasing in volume. The amount of free play provided by the circumferential spacing between wall portions 68e,68f and valving members 77c,77d is preferably, but not limited to, an amount necessary to provide unrestricted flow of oil around the associated valving members, e.g., oil flow around valving members 77c when valving members 77d are against their associated wall portions 68f. For the embodiment disclosed herein, a total free play two to four rotational degrees is adequate. Alternatively, the free play may be one-quarter to one-third the diameter of the passages.

During an operational mode when the direction of torque is such that valving surfaces 77c move away from wall portions 68e and valving members 77d move into or toward contact with wall portions 68f, passages 86 are fully open and passages 88 are closed or partially closed. During such an operational mode, chamber 78a tends to increase or expand in volume and torque converter oil flows relatively freely thereto to prevent cavitation, and chamber 78b tends to decrease in volume and oil flow therefrom is either prevented or restricted enough to significantly effect a pressure rise therein which increases damping.

Operation of transmission 12 is in accordance with the FIG. 6 chart showing clutch and brake engagements to effect the reverse and forward speed ratio modes of operation. In first and reverse, 100% of driveline torque is transmitted to the ratio section via the torque converter (T/C). In second and third, 100% of the driveline torque is transmitted via torsion spring assembly (T/S)20. When the transmission is in third, clutch OWC-2 engages to provide a torque reaction for sun gear 40. While the transmission is in either second or third, driveline torsionals emanating from the engine are isolated or attenuated by the torsion spring assembly 20 and are damped by the shock absorbing or energy dissipating action of damper assembly 22 and by the variable friction forces at interfaces 68a,74a of members 68,74. For example, when torsionals cause a sudden relative rotation of first and second housing members 66,68 such that chambers 78a decrease in volume and chambers 78b increase in volume, the energy in the torsionals is converted to an increase in the pressure of the oil in chambers 78a and somewhat of a decrease in the pressure of the oil in chambers 78b. The pressure increases are proportional to the rate of change of the torsionals and are greater than the pressure decreases. Elastomeric balls 90 in chambers 78a,78b prevent contact of the vanes.

Figure 7:
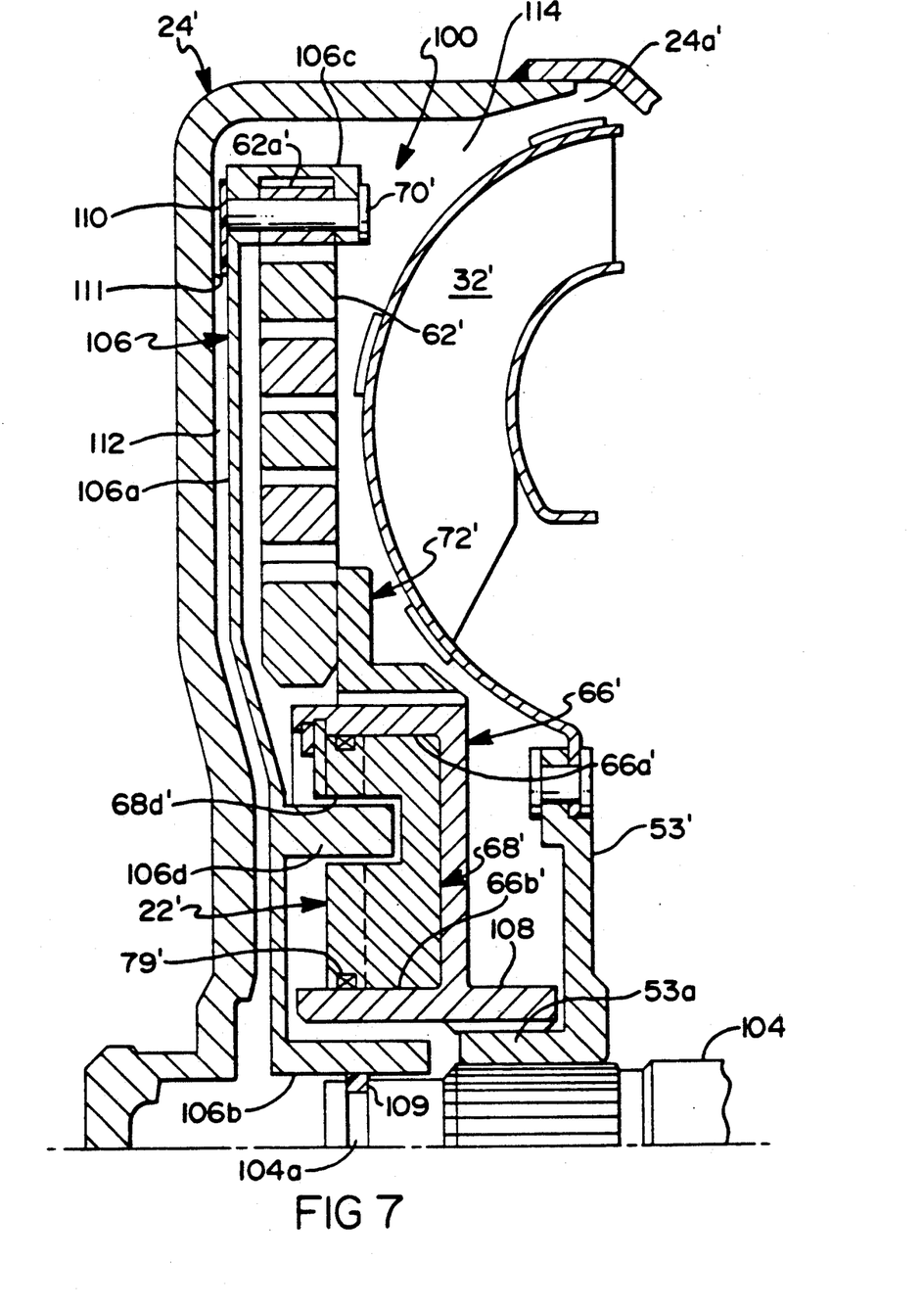
FIG. 7 is a modified embodiment of the torsion damping assembly.

Looking now at the modified embodiment of FIG. 7, therein elements which are substantially identical to elements in the previously described figures will be identified with the same reference numerals suffixed with a prime. The torsion damping isolator assembly 100 of FIG. 7 embraces the principles of the damping assembly 19 but is modified to be frictionally clutched to the torque converter housing 24' to effect bypass of the torque converter to a shaft 104 which is normally driven by the torque converter turbine 32' via the member 53'. The modification consists mainly of the addition of a clutch plate 106, a cylindrical extension 108 of the inner cylindrical wall 66b' of the damper assembly 22'. Clutch plate 106 includes a radially extending portion 106a having an axially extending hub portion 106b at its radially inner edge and a U-like flange portion 106c at its radially outer edge. The inner surface of hub portion 106b is in sliding contact with an O-ring seal 109 disposed in a groove 104a of shaft 104. The U-like flange portion 106c is connected to the radially outer ends 62a' of springs 62' by pins 70'. Clutch plate 106 includes an annular friction lining 110 bonded thereto and frictionally engagable with a confronting surface 111 of the torque converter housing. Clutch plate 106 includes a set of axially extending lugs 106d analogous to lugs 77a and received by recesses 68d' in the second housing member 68'. The inner surface of cylindrical extension 108 is slidably splined to the outer surface of a hub portion 53a of member 53'. Clutch plate 106 divides torque converter chambers 24a' into two chambers, a chamber 112 between the clutch plate and the radially extending portion of the torque converter housing, and a chamber 114 between the clutch plate and the torque converter.

During non-bypass operation of the torque converter in FIG. 7, pressurized transmission oil is admitted to the torque converter via chamber 112. The oil in chamber 112 prevents frictional engagement of the friction lining 110 with surface 111. The oil thus flows radially outward in chamber 112 past lining 110 and into chamber 114 for flow to the torque converter. When it is desired to engage torsion damping assembly 100, as, for example, when the vehicle is operating in a higher gear ratio and above a predetermined vehicle speed, the direction of flow of the pressurized oil is reversed by actuation of a suitable valve, not shown. Specifically, the pressurized oil is now admitted to chamber 114 where it acts against the radially extending portion 106a of clutch plate 106 and slides the entire damping assembly to the left to frictionally engage lining 110 with surface 111. Driveline torque now bypasses the torque converter and is transmitted to shaft 104 via the damping assembly. Since clutch plate 106 is not normally engaged when the engine is at idle, torsion damping assembly 100 does not require driving connections which suppress idle rattle. Hence, the loose spline connections to the outer periphery of the housing member 66 and to housing member 68 for suppression of idle rattle are not needed.

Looking now at FIGS. 8-11, the torsion damping isolator assembly 200 therein is functionally the same as the damping assemblies in FIGS. 2 and 7. However, assembly 200 differs structurally in several ways. As in FIGS. 2 and 7, assembly 200 includes a pair of nested, flat, spiral wound springs 202,204, and a vane type damper mechanism 206 including housing members 208,210 defining an annular chamber 212, and, as in FIG. 7, assembly 200 incudes a clutch plate 216. Plate 216 includes a radially extending portion 216a having an axially extending hub portion 216b at its center and an axially extending flange portion 216c at its radially outer edge. An inner cylindrical surface of hub portion 216b cooperates with the O-ring seal 109 in FIG. 7 and an outer cylindrical surface of the hub portion provides a journal for an inner cylindrical surface of housing member 208.

Annular chamber 212 includes radially spaced apart cylindrical surfaces 212a,212b defined by axially extending annular wall portions 208a,208b of housing member 208, and axially spaced apart end surfaces 212c,212d respectively defined by a radially extending portion 208c of housing member 208 and housing member 210. Housing wall portion 208b includes a set of internal splines 208d which slidably cooperate with splines on hub portion 53a in FIG. 7 or directly with the splines on shaft 104. Annular chamber 212 is divided into three arcuate chambers 217 sealed from each other by fixed vanes or walls 218. The walls are press fit into grooves in wall portions 208a,208b,208c, and extend radially and axially across the annular chamber. Radially extending wall 208c is structurally strengthened by raised bases 208e at the location of the grooves therein for walls 218. The radially outer extent of axially extending wall 208a includes a radially outwardly extending flange 208f and a pair of scroll shaped pad portions 208g to reduce transverse stress concentrations in the springs when they decrease in overall diameter due to transmission of torque in the positive direction.

Figure 10:
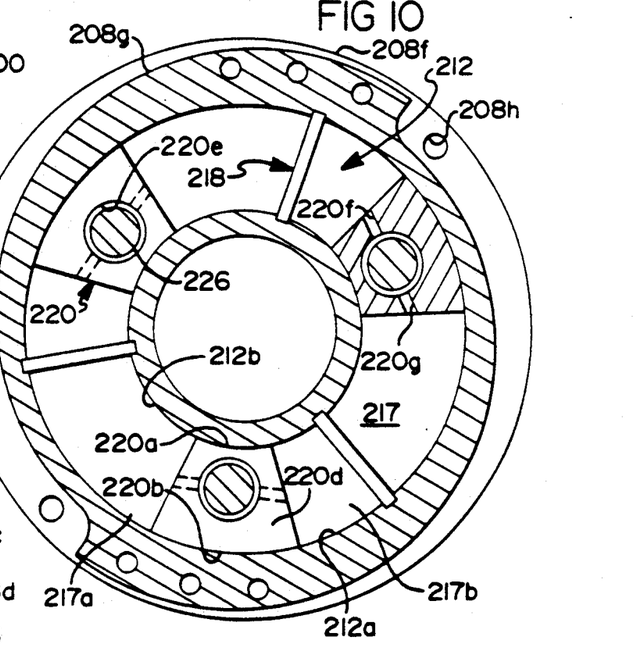
FIG. 10 is a sectional view of the vane damper looking along line 10—10 in FIG. 8.
Figure 11:
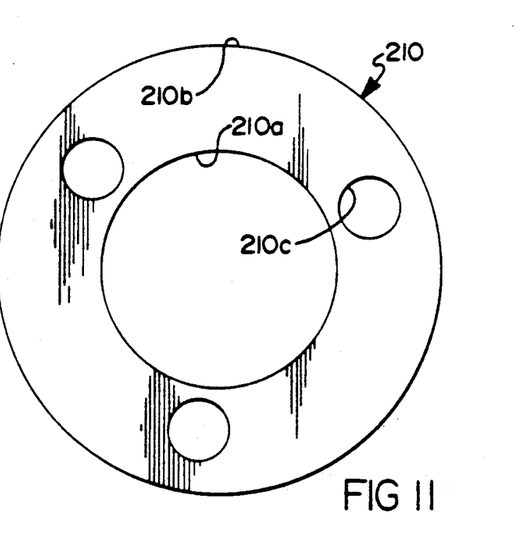

Each arcuate chamber 217 is divided into pairs of variable volume chambers 217a,217b by movable vanes or pistons 220. Pistons 220 are each separate members. Each piston includes radially inner and outer surfaces 220a,220b in sliding sealing relation with housing member cylindrical surfaces 212a,212b, an axially facing end surfaces 220c in sliding sealing relation with housing end surface 212c, and an axially facing end surface 220d in sealing relation with end surface 212d of housing member 210. Each piston also includes a blind recess or bore 220e and restricted passages 220f,220g for communicating variable volumes 217a,217b with the pressurized oil in torque converter compartment 24a via recesses 220e. In FIG. 10, one of the pistons 220 is sectioned through the restricted passages. Axial spacing of the piston end surfaces between the end surfaces of the chamber and controlled and maintained by an annular shim 222 sandwiched between housing member 210 and a radially inner portion 224a of an annular flange 224. Flange 224 abuts the free axial end of housing wall 208a and is affixed to housing member 208 by appropriate fasteners, such as by two sets of three fasteners 225 which extend through openings in flange 224, openings in pad portions 208g, and openings in flange 208f. A radially outer portion 224b of flange 224 includes through openings 224c spaced 180 degrees apart and in axial alignment with openings 208h in flange 208f.

Housing member 210 includes inner and outer circumferential surfaces 210a, 210b in sliding sealing relation with cylindrical wall surfaces 212a,212b, and three circumferentially spaced apart through openings 210c which loosely receive round pin lugs 226 fixed at one end to clutch plate 216 and the other end received by piston recesses 220e. As in the embodiment of FIGS. 2 and 7, the lugs function as valving members to control torque converter oil flow into and out of the variable volume chambers. Further, since pistons 220 are separate members, lugs 226 position and fix the circumferential spacing of the pistons such that the valving relation of each lug is always in proper relation with the associated restricted passage even if the circumferential spacing of the lugs on plate varies during manufacture.

Housing member 208 and pistons 220 may be made of any suitable material and may be formed by any of several well known processes. Herein, they are preferably formed of powered metal and surfaces thereof, which form sliding sealing relation with each other, may be ground.

Figure 8:
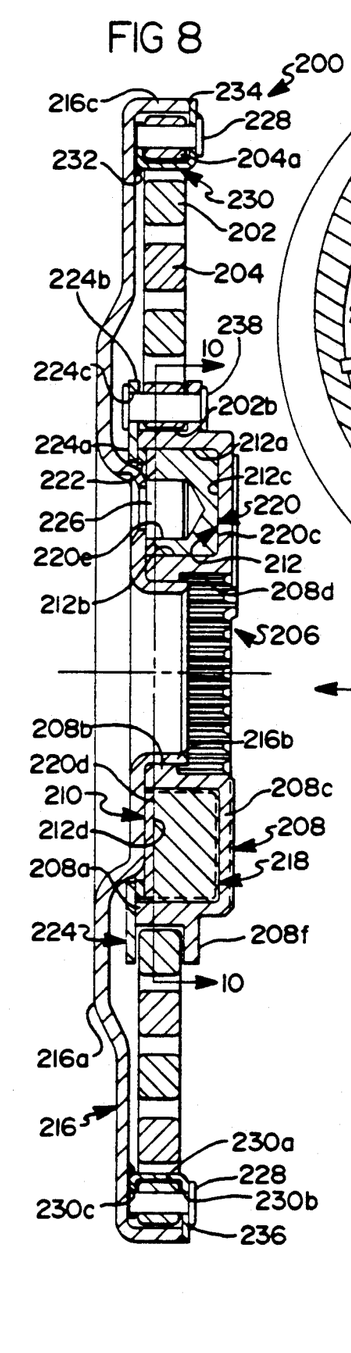
FIG. 8 is a staggered sectional view looking along line 8—8 in FIG. 9.
Figure 9:
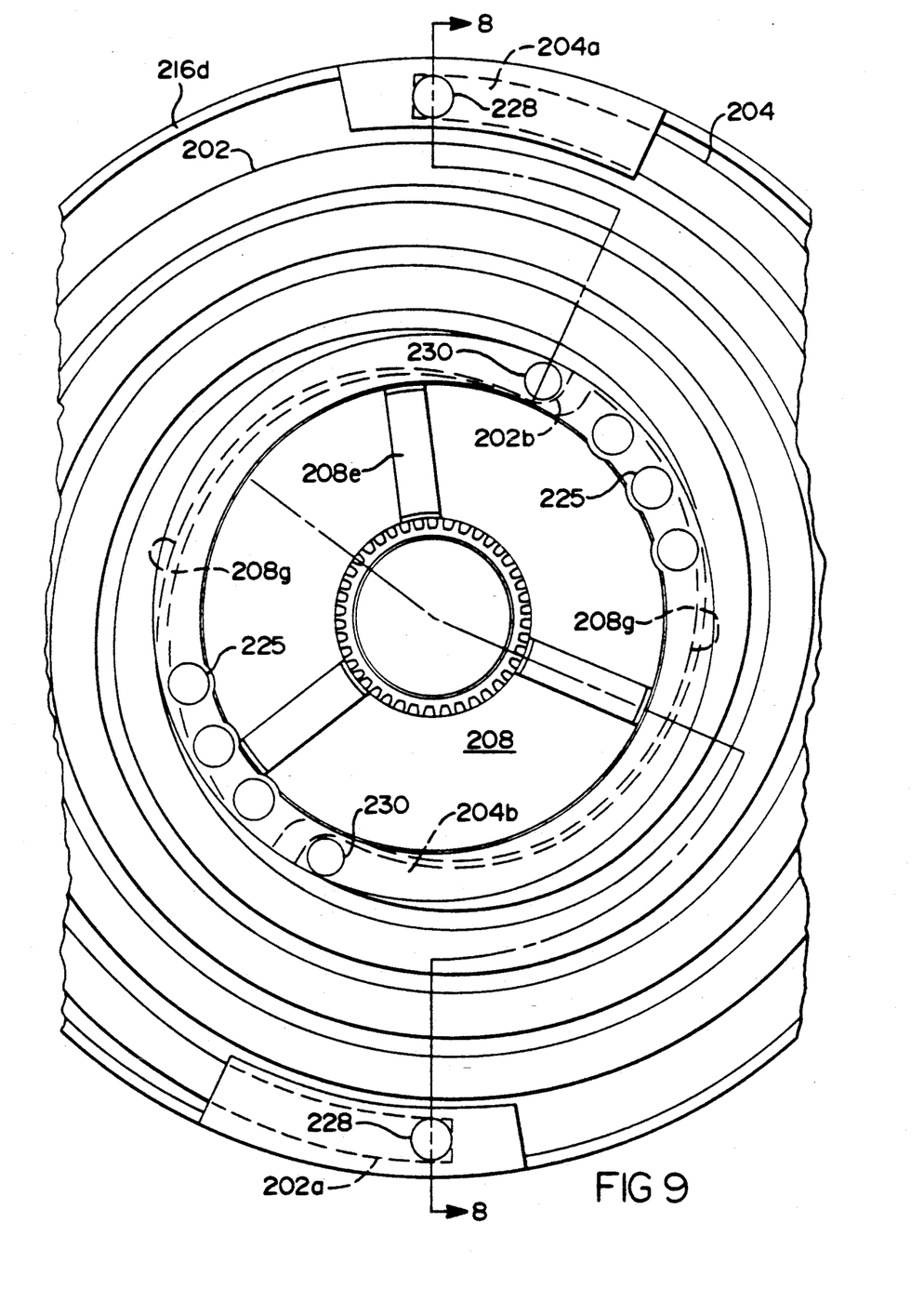
FIG. 9 is an elevational view looking in the direction of arrow 9 in FIG. 8.

Springs 202,204 respectively include radially outer ends 202a,204a and radially inner ends 202b,204b. The ends are attached in a manner to reduce stress concentrations and improve life. Outer ends 202a,204a are secured to the radially outer extent of clutch plate 216 by pins 228 and brackets 230. Pins 228 transmit torque between the clutch plate and the springs and brackets 230 support the outer spring ends in cantilever fashion (i.e. prevents free pivotal movement of ends 202a, 204a) to improve stress distribution in the springs as they wind up or contract radially inward while transmitting torque in the positive direction. Brackets 230 have a somewhat J-shaped cross section, as shown in FIG. 8. The brackets are welded to plate 216 at 232,234 and provide a pocket which axially and radially confines spring end movement The axially extending and radially inward lag 230a of each bracket follows the scroll curvature of the springs. Pins 228 are received in axially aligned bores 230b,230c in radially extending lags of the brackets and in bores in the spring ends. Each pin is locked in place by a weld 236. The inner ends 202b,204b of the springs are secured to housing member 208 by pins 238 extending through axially aligned openings 208h,224c and received in a bore in each spring end. When the springs are transmitting positive torque and tending to wind up, pivotal movement of the spring ends 202b,204b is limited by scroll pads 208g. When the springs are transmitting negative torque and tending to unwind or expand radially, pins 228 allow free pivotal movement of the spring ends.

While the embodiments of the present invention have been illustrated and described in detail, it will be apparent that various changes and modifications may be made in the disclosed embodiments without departing from the scope or spirit of the invention. The appended claims are intended to cover these and other modifications believed to be within the spirit of the invention.

What is claimed is:

1. A torsional isolator assembly including resilient means and a damping mechanism connected in parallel between first and second drives, the drives adapted to be serially connected in a driveline; the resilient means being at least two nested spiral wound springs having radially outer and inner ends drivingly connected between the drives by attachment means for transmitting driveline torque between the drives and operative to flex and thereby attenuate driveline torsionals; the damping mechanism including first and second assemblies respectively adapted for driving connection with the first and second drives; the assemblies mounted for relative to-and-fro rotation about a common axis in response to relative to-and-fro rotation of the drives effected by flexing of the springs and operative to damp flexing of the springs; characterized by:

the attachment means of the spring outer ends including means for preventing pivotal movement of the spring outer ends when the springs are contracting radially inward;

the attachment means of the spring inner ends including means for allowing unrestricted pivotal movement of the spring inner ends when the springs are expanding radially outward; and the first drive includes an annular radially extending clutch plate adapted to be disposed in a torque converter housing of the driveline; the outer spring ends attachment means affixed to a radially outer portion of the plate and the plate affixed to one of the damping mechanism assemblies.

2. The isolator assembly of claim 1, wherein the first and second assemblies of the damping mechanism define an expandable chamber mechanism for hydraulically damping driveline torsionals, the mechanisms disposed in a torque converter housing of the driveline, and the torque converter housing filled with an incompressible fluid and the mechanism immersed therein;

the first assembly including first and second relatively rotatable housing means defining an annular chamber having radially spaced apart cylindrical surfaces and first and second axially spaced apart end surfaces, the cylindrical surfaces and the first end surface defined respectively by first and second axially extending radially spaced annual wall portions and a radially extending end wall portion of the first housing means, and the first housing means including circumferentially spaced apart walls sealingly fixed thereto and extending radially and axially across the annular chamber for dividing the annular chamber into at least two arcuate chambers;

the second assembly including a piston disposed in each arcuate chamber, the pistons in sliding sealing relation with the cylindrical surfaces and the first end surface and in sealing relation with the second end surface, and the pistons dividing each arcuate chamber into pairs of volumes which vary inversely in volume in response to movement of the pistons relative to the first housing means;

the second housing member defining the second end surface of the annular chamber and being the sliding sealing relation with the annular wall portions of the first housing means.

3. The isolator assembly of claim 2, wherein:

the first housing means annular wall defining the first cylindrical surface includes first portions spaced substantially one-hundred eighty degrees apart and extending radially outward therefrom; and an annular flange fixed to the first housing means by fasteners, radially outer portions of the flange having second portions in axially spaced alignment with the first portions, the spring inner ends disposed between the first and second portions and pivotally attached thereto.

4. The isolator assembly of claim 3, wherein:

the second housing means being a radially extending annular housing member with the second end surface thereof being in sealing relation with adjacent axially facing ends of the pistons.

5. The isolator assembly of claim 4, wherein:

the annular flange includes a radially inner portion for preventing axial movement of the annular housing member in a direction away from the first end surface of the annular chamber.

6. The isolator assembly of claim 5, wherein:

the pistons are separate members; and means for drivingly connecting the pistons to the first drive includes a set of drive lugs drivingly connected between the pistons and first drive means and extending axially through openings in the annular housing member.

7. The isolator assembly of claim 6, further including:
an annular radially extending clutch plate disposed in the torque converter housing and defining the first drive, the plate including means for securing the spring outer ends thereto and including an axially extending center portion having an outer cylindrical surface for journaling thereon an inner cylindrical surface of the first housing means.

8. A torsion isolator assembly adapted to be disposed for rotation about an axis in a driveline torque converter housing filled with an incompressible torque converter fluid, the assembly immersed in the fluid and drivingly connected between first and second rotatably mounted drives; the assembly comprising a hydraulic coupling for damping driveline torsionals and resilient means for transmitting driveline torque between the drives; the coupling including first and second housing means disposed for relative rotation about the axis and defining an annular chamber divided into at least two arcuate chambers by circumferentially spaced apart walls sealingly fixed to the first housing means and extending radially and axially across the annular chamber, a piston disposed in each arcuate chamber and dividing each arcuate chamber into pairs of volumes which vary inversely in volume in response to movement of the pistons relative to the first housing means, means for drivingly connecting the pistons to the first drive via a path independent of the resilient means and for drivingly connecting the first housing means to the second drive independent of the resilient means, and restricted passage means for communicating the pairs of volumes with the fluid in the torque converter housing; the resilient means including at least two, nested, flat wound spiral springs disposed for rotation about the axis, each spring having a radially outer end and a radially inner end with the respective inner and outer ends disposed substantially one-hundred eighty degrees apart, and means for securing the outer ends to the first drive and the inner ends to the second drive; characterized by:
the means securing the spring inner ends including means for allowing unrestricted pivotal movement of the inner ends.

9. The isolator assembly of claim 8, wherein the means securing the spring outer ends includes means for restricting pivotal movement of the outer ends.

10. The isolator assembly of claim 8, wherein the annular chamber includes first and second radially spaced apart cylindrical surfaces and first and second axially spaced apart end surfaces, the cylindrical surfaces and the first end surface defined respectively by first and second axially extending, radially spaced annular walls and a radially extending end wall of the first housing means.

11. The isolator assembly of claim 10, wherein:
the first housing means annular wall defining the first cylindrical surface includes first portions spaced substantially one-hundred and eighty degrees apart and extending radially outward therefrom; and
an annular flange fixed to the first housing means by fasteners, radially outer portions of the flange having second portions in axially spaced alignment with the first portions, the spring inner ends disposed between the first and second portions and pivotally attached thereto.

12. The isolator assembly of claim 11, wherein:
the second housing means being a radially extending annular housing member defining the second end surface of the annular chamber, the second surface being in sealing relation with adjacent axially facing ends of the pistons, and the housing member being in sliding sealing relation with portions of the circumferentially spaced apart walls of the first housing means.

13. The isolator assembly of claim 12, wherein:
the annular flange includes a radially inner portion for preventing axial movement of the annular housing member in a direction away from the first end surface of the annular chamber.

14. The isolator assembly of claim 13, wherein:
the pistons are separate members; and
the means for drivingly connecting the pistons to the first drive includes a set of drive lugs drivingly connected between the pistons and first drive means and extending axially through openings in the annular housing member.

15. The damper assembly of claim 14, further including:
an annular radially extending clutch plate disposed in the torque converter housing and defining the first drive, the plate housing the means for securing the spring outer ends affixed thereto and the plate including an axially extending center portion having an outer cylindrical surface for journaling thereon an inner cylindrical surface of the first housing means.

16. A torsion isolator assembly adapted to be disposed for rotation about an axis in a driveline torque converter housing filled with an incompressible torque converter fluid, the assembly immersed in the fluid and drivingly connected between first and second rotatably mounted drives; the assembly comprising a hydraulic coupling for damping driveline torsionals and resilient means for transmitting driveline torque between the drives; the coupling including first and second housing means disposed for relative rotation about the axis and defining an annular chamber divided into at least two arcuate chambers by circumferentially spaced apart walls sealingly fixed to the first housing means and extending radially and axially across the annular chamber, a piston disposed in each arcuate chamber and dividing each arcuate chamber into pairs of volumes which vary inversely in volume in response to movement of the pistons relative to the first housing means, means for drivingly connecting the pistons to the first drive via a path independent of the resilient means and for drivingly connecting the first housing means to the second drive independent of the resilient means, and restricted passage means for communicating the pairs of volumes with the fluid in the torque converter; an annular radially extending clutch plate disposed in the torque converter housing and defining the first drive; characterized by:
the clutch plate including an axially extending center portion having an outer cylindrical surface for journaling thereon an inner cylindrical surface of the first housing means.

17. The isolator assembly of claim 16, wherein:
the second housing means being a radially extending annular housing member defining the second end surface of the annular chamber, the second end surface being in sealing relation with adjacent axially facing ends of the pistons, and the housing member being in sliding sealing relation with portions of the circumferentially spaced apart walls of the first housing means.

18. The isolator assembly of claim 17, wherein:

the pistons are separate members; and the means for drivingly connecting the pistons to the first drive includes a set of drive lugs drivingly connected between the pistons and first drive means and extending axially through openings in the annular housing member.

19. The isolator assembly of claim 16, wherein:

the resilient means including at least two, nested, flat wound spiral springs disposed for rotation about the axis, each spring having a radially outer end and a radially inner end with the respective inner and outer ends disposed substantially one-hundred and eighty degrees apart, and means for securing the outer ends to the first drive and the inner ends to the second drive; characterized by:

the means securing the spring inner ends including means for allowing unrestricted pivotal movement of the inner ends.

20. The isolator assembly of claim 19, wherein the means securing the spring outer ends includes means for restricting pivotal movement of the outer ends.

21. The isolator assembly of claim 20, wherein the annular chamber includes first and second radially spaced apart cylindrical surfaces and first and second axially spaced apart end surfaces, the cylindrical surfaces and the first end surface defined respectively by first and second axially extending, radially spaced annular walls and a radially extending end wall of the first housing means.

22. The isolator assembly of claim 21, wherein:

the first housing means annular wall defining the first cylindrical surface includes first portions spaced substantially one-hundred and eighty degrees apart and extending radially outward therefrom; and an annular flange fixed to the first housing means by fasteners, radially outer portions of the flange having second portions in axially spaced alignment with the first portions, the spring inner ends disposed between the first and second portions and pivotally attached thereto.

* * * * *